May 24, 1960
C. B. BARLOW
2,937,541
FAIL-SAFE UP LOCK MECHANISM
Filed Jan. 17, 1956
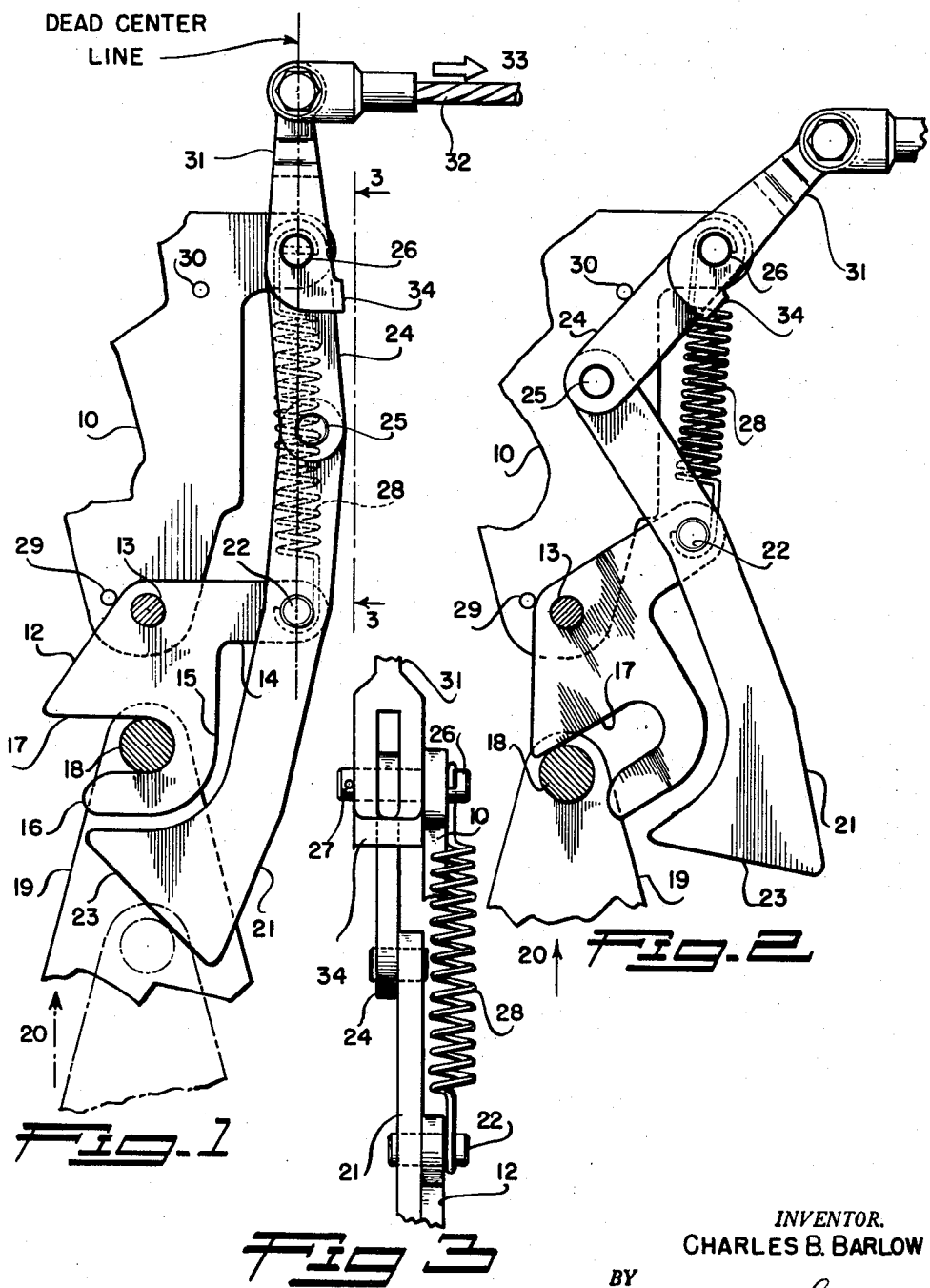
INVENTOR.
CHARLES B. BARLOW
BY
George C. Sullivan
Agent

United States Patent Office

2,937,541
Patented May 24, 1960

2,937,541

FAIL-SAFE UP LOCK MECHANISM

Charles B. Barlow, 2895 Sterling Place, Altadena, Calif.

Filed Jan. 17, 1956, Ser. No. 559,586

2 Claims. (Cl. 74—532)

This invention relates to retractable or extendable devices and has special reference to an improved and simplified mechanism for the locking of such devices in a retracted or extended position.

In the aircraft industry, as well as other industries, it has been the conventional practice to employ a lock mechanism comprising a pivoted latch having an integrally formed hook for retaining a device such as a landing gear assembly or door in a retracted or extended position. Generally, the term retractable refers to drawing back to or into a structure or frame while extendable refers to drawing or stretch out from a structure or frame. Usually, as the device is retracted for example, a pin carried by the device engages the latch which pivots the hook from an open or upper position into a lower position to engage the pin and thereby retains the assembly in a retracted position. Difficulties have been encountered when employing a lock of this conventional type which are due in part to the fact that at times, the latch may be inadvertently positioned so that the hook is in its lower position whence it cannot be positioned or pivoted to receive the pin. In this instance, the pin will strike the hook and bind against the hook or damage the hook. Furthermore, the assembly is not locked in its retracted position which is of even greater consequence.

These difficulties are overcome in the present invention in which a control mechanism is associated with the latch so that when the hook is in its lower position as the assembly is retracted, the pin will engage the control mechanism which then actuates the hook into a position to receive the pin. The inclusion of a cooperating control mechanism obviates the possibility of the hook being in a lowered position when the assembly is retracted and insures absolute pin and hook engagement to retain the assembly. It should be understood that the present invention may be employed to retain assemblies in any desired position and that the mention of a landing gear assembly and the retraction and extension thereof is employed for purposes of example and illustration.

In one form of the present invention, a U-shaped hook is pivotally carried on the frame of the airplane to have an upper and lower position when the assembly is extended and retracted respectively. Control means are provided for positioning the hook into its upper position to receive the pin carried by the assembly when the same is retracted. Other means are provided for actuating the hook into its lower position to retain the pin and thereby lock the assembly in its retracted position.

It is another object of the present invention to provide a means for actuating the lock to permit engagement of the hook with the assembly regardless of the position of the lock at the time of assembly retraction.

It is still another object of the present invention to provide an improved means for actuating the lock to permit engagement of the hook with the assembly which means is automatically operated by the retraction of the assembly.

These objects and features are described in the following text with reference to the accompanying drawings, in which:

Figure 1 is an elevational view in accordance with the present invention of a portion of a frame and a retractable assembly being shown in its retracted position in full lines and in its retracting position in dotted lines;

Figure 2 is a side view corresponding to Figure 1 showing the up lock in its upper position so that the pin may be received into the hook portion of the up lock; and Figure 3 is an edge elevational view taken along line 3—3 of Figure 1.

As shown in the drawings, the embodiment chosen for illustration relates to a frame 10 which may be carried by an airplane, only the under portion of which is shown such as the under side of a wing or fuselage, depending upon the retractable landing gear system employed.

An up lock or latch 12 is pivotally mounted on the frame by means of a pivot rod 13 and comprises an extension 14, and a U-shaped hook 15 having a lip portion 16. A cam surface 17 is provided at the entrance to the hook and is arranged with respect to the pivot rod so that pressure or force applied to the cam surface by a pin 18 will cause the latch to rotate clockwise.

A pin 18 attached to an assembly 19 is constructed and arranged to move longitudinally or vertically substantially in line with the vertical plane of the pivot rod 13. This arrangement insures engagement of pin 18 with cam surface 17 when the hook is in its upper position, shown in Figure 2. A control means is associated with the latch and is employed to position the hook in the upper and lower positions. As shown in Figure 1, the hook is in its lower position and the pin rests on the hook lip 16 to retain the retracted assembly. Figure 2 shows that as the assembly 19 moves in the direction of arrow 20, engagement between the pin and cam surface 17 occurs. Conversely, the hook 15 may be actuated to its upper position in order to release the pin from the hook when it is desired to extend the assembly.

The control means comprises a lever 21 pivotally attached to the latch 12 by means of a connector pin 22 attached to extension 14. One end of the lever is formed to partially encircle the hook 15 including lip portion 16, and is provided with a linear cam surface 23. The linear cam surface is at an oblique angle to cam surface 17 and is arranged to intercept the travel of pin 18 in the event that hook 15 is in its lower position while the assembly is retracing in the direction of arrow 20. A link 24 is freely pivotally attached to the other end of lever 21 by means of a connector pin 25. The other end of the link is pivoted on a connector stud 26 which is attached to the frame 10 by means of a retaining pin and washer arrangement 27. A spring 28, connected to pin 22 and stud 26, provides sufficient tension to contract the pin and stud. The lever 21 and the link 24 in combination with spring 28 are arranged under tension between stud 26 and connector pin 22 and in effect form a spring loaded toggle having a dead center line extending through the longitudinal axis of connector pin 22 and stud 26. A pair of travel limiting stops 29 and 30 are provided on the frame 10 which restrict the rotation of the latch.

When connector pin 25 is on the right side of the dead center line, the hook is maintained in its lower or "closed" position against the stop 29 by the tension of spring 28. When connector pin 25 is on the left side of the dead center line, the hook is maintained in its upper or "open" position by the contraction or tension of spring 28. The stop 30 restricts the rotation of latch 12 and the amount of toggle linkage over-travel and thus locates or stops the latch 12 in the lower position where cam surface 17 is in the path of assembly travel to receive the pin 18 as the assembly retracts.

Also pivotally supported on connector stud 26 is a yoked lever 31 engageable with the link by means of a cross member 34 connecting the yokes of the lever. Lever 31 is arranged to pivot on connector stud 26 in one direction to actuate link 24 and lever 21, movement of the lever 31 in the other direction having no effect on the link or lever 21. A cable 32 is suitably attached to one end of the lever 31 and extends to a lock actuator (not shown). The actuator may be any of the conventional types which will pivot the lever 31. The assembly will retract and be locked in its retracted position regardless of position of lever 31. The cable is pulled in the direction of arrow 33 to actuate the hook into its upper position.

In operation, the assembly is released by actuating the cable 32 in the direction of the arrow 33. This action causes lever 31 to pivot clockwise on connector stud 26 and engage cross member 34 with link 24. The engagement is accomplished above the center of the link so that the link is forced to pivot on connector stud 26 in a manner which moves connector pin 25 across the toggle dead center line. Movement of the link also activates lever 21 to have its end connected to the link cross the dead center line which in effect pivots lever 21 on connector 22. When connector pin 25 overtravels the dead center line, spring 28 contracts and its tension causes latch 12 to pivot counter-clockwise on pivot rod 13. Pivoting of latch 12 positions the hook 16 in its upper position and permits pin 18 to be released from the hook. The stop 30 is provided to limit the opening travel of latch 12. The assembly may now be extended by hydraulic pressure, if desired, into its extended position. Release of tension on the cable 33 allows lever 31 to rotate on connector stud 26 to its position shown in Figure 1 without actuating or dislodging the control means for the latch.

Retraction of the assembly is accomplished by applying hydraulic pressure or other suitable means to the assembly causing it to retract toward a wing or fuselage of the airplane for example. The assembly retracts until cam surface 17 on the latch 12 intercepts the travel of pin 18 and further pressure of pin 18 against the cam surface causes the latch 12 to pivot in a clockwise direction and positions the hook 16 in a lower position encompassing the pin. This rotary motion of the latch also applies tension to the spring 28 which in turn causes the toggle linkage formed by lever 21 and the link 24 to overtravel the dead center line until the link engages the cross member 34 of lever 31. At this time, spring 28 contracts between the connectors 22 and 26 to force the connector 25 of the toggle linkage outwardly. The spring tension applied in this instance is sufficient to retain the control mechanism, and therefore the latch 12 in this lowered position.

In the event that the hook 15 is inadvertently actuated to or left in its lower position at a time when the assembly is being retracted, the pin 18 will engage cam surface 23 carried by lever 21 and force the toggle linkage to overtravel the dead center line and cause the latch 12 to rotate in a counter-clockwise direction which places the hook in a position to receive the pin. Normal operation then ensues with the engagement of the pin with the cam surface 17 carried by the latch. The presence of the semicircular end of lever 21 carrying cam surface 23 assures that the pin 18 will be intercepted during its upward travel in the event that the hook lip 16 is inadvertently placed between cam surface 17 and the travel of pin 18.

Having described only a typical form of the invention, I do not wish to be limited to the specific details herein set forth, but wish to reserve to myself any variations or modifications that may appear to those skilled in the art or fall within the scope of the following claims.

I claim:

1. A retention and release mechanism for a retractable assembly having a pin comprising, a frame, a hook rotatably carried on the frame, an extension on the hook lying in a parallel plane with the extension, a first cam surface formed on the hook, toggle linkage connected between the extension and the frame to hold the hook in a selected position to receive the pin of the retractable assembly, a second cam surface formed on the toggle linkage at an angle relative to the first cam surface interfering with the travel of the pin when the hook is in its other than selected position, and means carried on the frame for limiting the travel of the toggle linkage on either side of a dead center line lying on the connection of the extension to the toggle linkage and the connection of the toggle linkage to the frame.

2. A retention and release mechanism for a retractable assembly having a pin comprising, a frame, a hook rotatably carried on the frame adaptable to receive the pin of the retractable assembly, an extension on the hook, a first cam surface formed on the hook normally lying in the direction of pin travel of the retractable assembly, the first cam surface lying in a parallel plane with the extension, toggle linkage connected between the extension and the frame to hold the hook in one of alternate positions, a second cam surface provided on the toggle linkage to be engaged by the pin when the hook is in one of its alternate positions, the first and second cam surfaces arranged to move relative with respect to each other, and means carried on the frame for limiting the travel of the toggle linkage on either side of a dead center line crossing the connection of the extension to the toggle linkage and the connection of the toggle linkage to the frame, and said toggle linkage operable in response to engagement of the pin with the second cam surface to rotate the hook to its selected position to receive the pin.

References Cited in the file of this patent

UNITED STATES PATENTS

| | | |
|---|---|---|
| 839,036 | Roberts | Dec. 18, 1906 |
| 2,177,553 | Speed et al. | Oct. 24, 1939 |
| 2,390,668 | Shaw | Dec. 11, 1945 |
| 2,443,629 | Matuszewski | June 22, 1948 |
| 2,476,734 | Jellison | July 19, 1949 |
| 2,491,400 | Thumim | Dec. 13, 1949 |
| 2,567,114 | Linn | Sept. 4, 1951 |
| 2,595,450 | Coffing | May 6, 1952 |
| 2,666,244 | Carmichael | Jan. 19, 1954 |
| 2,668,030 | Smith et al. | Feb. 2, 1954 |
| 2,735,599 | Coffing | Feb. 28, 1956 |

UNITED STATES PATENT OFFICE
CERTIFICATE OF CORRECTION

Patent No. 2,937,541                                            May 24, 1960

Charles B. Barlow

It is hereby certified that error appears in the above numbered patent requiring correction and that the said Letters Patent should read as corrected below.

In the grant, lines 1, 2 and 3, for "Charles B. Barlow, of Altadena, California," read -- Charles B. Barlow, of Altadena, California, assignor to Lockheed Aircraft Corporation, of Burbank, California, --; line 12, for "Charles B. Barlow, his heirs" read -- Lockheed Aircraft Corporation, its successors --; in the heading to the printed specification, line 3, for "Charles B. Barlow, 2895 Sterling Place, Altadena, Calif." read -- Charles B. Barlow, Altadena, Calif., assignor to Lockheed Aircraft Corporation, Burbank, Calif. --.

Signed and sealed this 10th day of January 1961.

(SEAL)
Attest:

KARL H. AXLINE                                                ROBERT C. WATSON
Attesting Officer                                       Commissioner of Patents